US012095173B2

(12) United States Patent
Hwang

(10) Patent No.: US 12,095,173 B2
(45) Date of Patent: Sep. 17, 2024

(54) UWB ANTENNA MODULE

(71) Applicant: AMOTECH CO., LTD., Incheon (KR)

(72) Inventor: Chul Hwang, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 238 days.

(21) Appl. No.: 17/622,682

(22) PCT Filed: Jun. 23, 2020

(86) PCT No.: PCT/KR2020/008173
§ 371 (c)(1),
(2) Date: Dec. 23, 2021

(87) PCT Pub. No.: WO2020/262942
PCT Pub. Date: Dec. 30, 2020

(65) Prior Publication Data

US 2022/0255225 A1 Aug. 11, 2022

(30) Foreign Application Priority Data

Jun. 25, 2019 (KR) ........................ 10-2019-0075759

(51) Int. Cl.
*H01Q 5/25* (2015.01)
*H01Q 1/48* (2006.01)
*H01Q 15/00* (2006.01)

(52) U.S. Cl.
CPC ................. *H01Q 5/25* (2015.01); *H01Q 1/48* (2013.01); *H01Q 15/004* (2013.01)

(58) Field of Classification Search
USPC .......................................................... 343/702
See application file for complete search history.

(56) References Cited

U.S. PATENT DOCUMENTS

| | | | | |
|---|---|---|---|---|
| 7,061,442 | B1 * | 6/2006 | Tang | H01Q 5/28<br>343/770 |
| 9,991,599 | B2 * | 6/2018 | Kanno | H01Q 1/243 |
| 11,088,436 | B2 * | 8/2021 | Noh | G06K 19/07 |
| 2005/0052322 | A1 | 3/2005 | Park et al. | |
| 2008/0079635 | A1 * | 4/2008 | Rowell | H01Q 1/243<br>343/702 |
| 2009/0295645 | A1 * | 12/2009 | Campero | H01Q 9/0407<br>343/700 MS |
| 2011/0273360 | A1 * | 11/2011 | Campero | H01Q 5/307<br>343/893 |
| 2019/0044230 | A1 | 2/2019 | Zaric | |

FOREIGN PATENT DOCUMENTS

| | | | | |
|---|---|---|---|---|
| CN | 109103595 A | * 12/2018 | H01Q 1/38 |
| EP | 1551079 A1 | * 7/2005 | H01Q 1/38 |
| KR | 10-2005-0010549 A | 1/2005 | |
| KR | 10-2010-0059076 A | 6/2010 | |

* cited by examiner

*Primary Examiner* — Hoang V Nguyen
*Assistant Examiner* — Brandon Sean Woods
(74) *Attorney, Agent, or Firm* — Maschoff Brennan

(57) ABSTRACT

Presented is a UWB antenna module configured to implement omni-directional characteristics with respect to bearings even when mounted on a metal ground plane. The presented UWB antenna module comprises: a base sheet; a radiation pattern formed on a front surface of the base sheet; and a ground pattern formed on the front surface of the base sheet and arranged to surround the radiation pattern.

10 Claims, 15 Drawing Sheets

[FIG. 1]
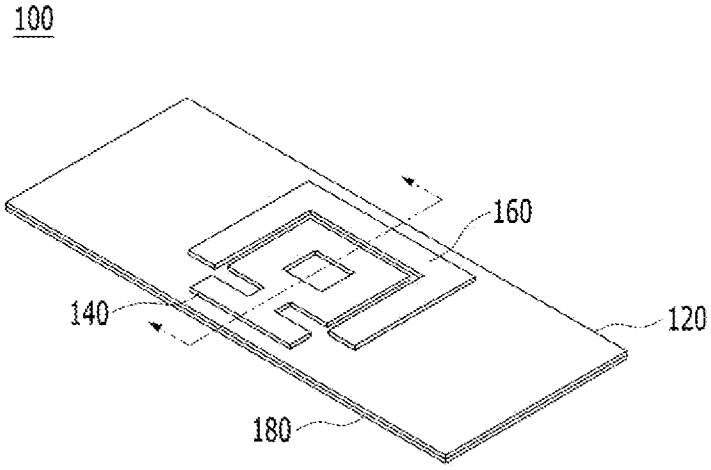

[FIG. 2]
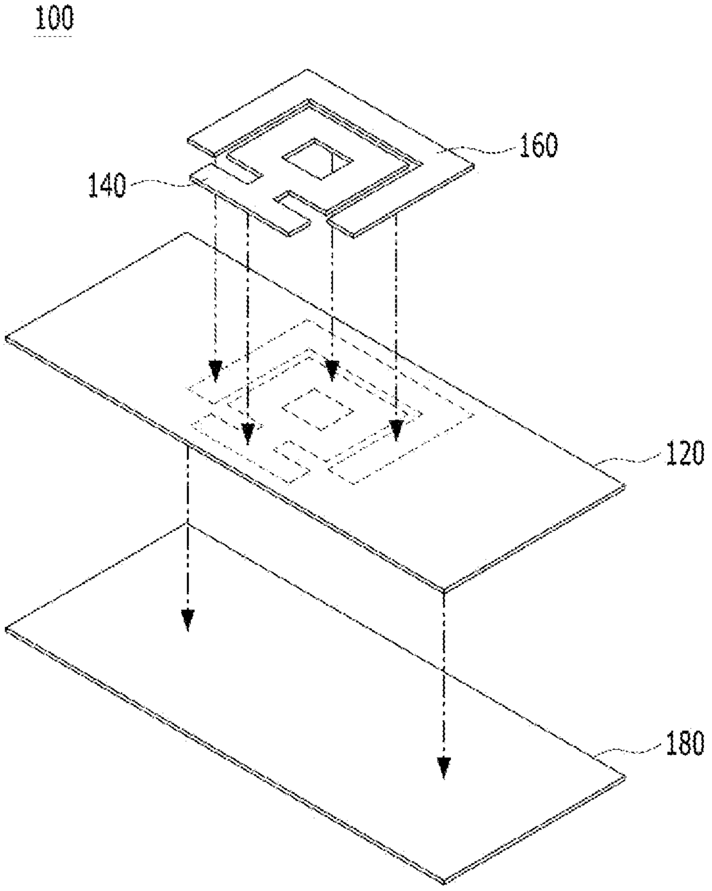
[FIG. 3]
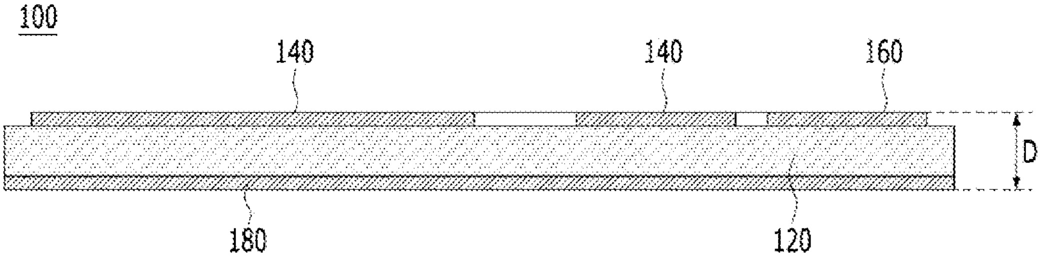

[FIG. 4]
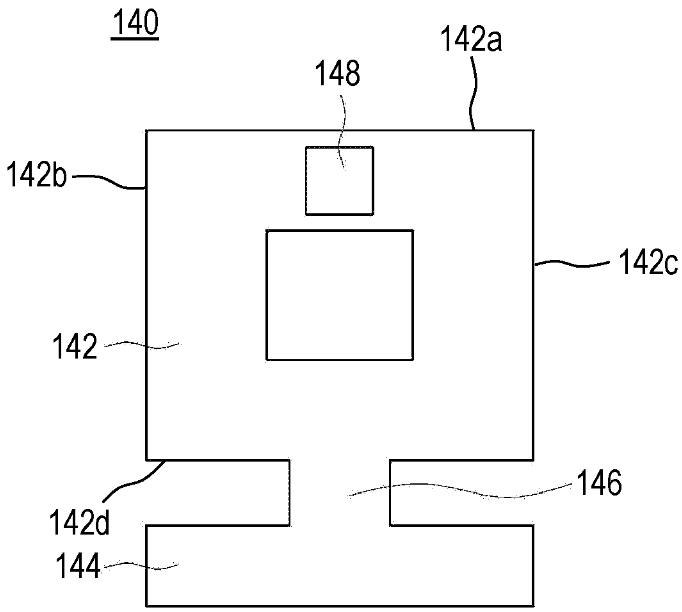
[FIG. 5]
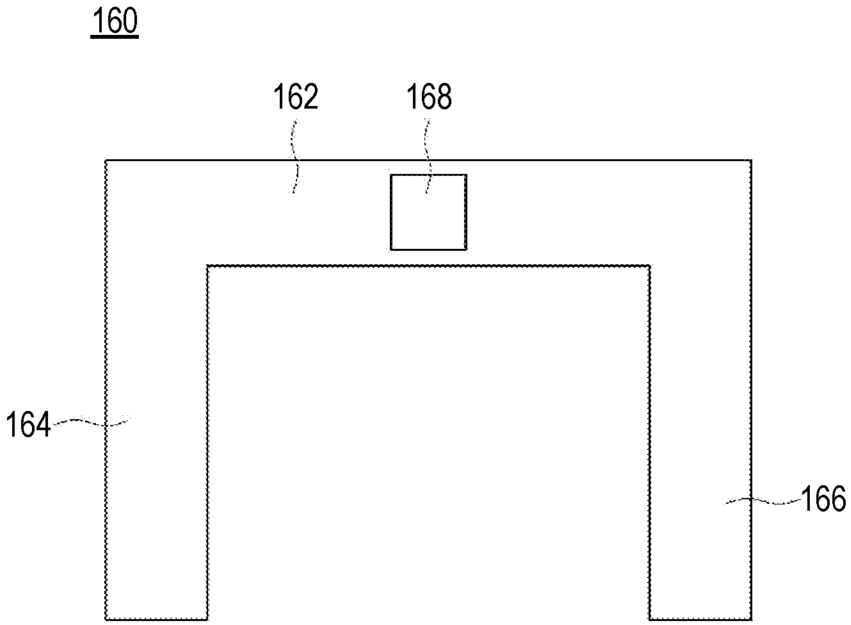

[FIG. 6]
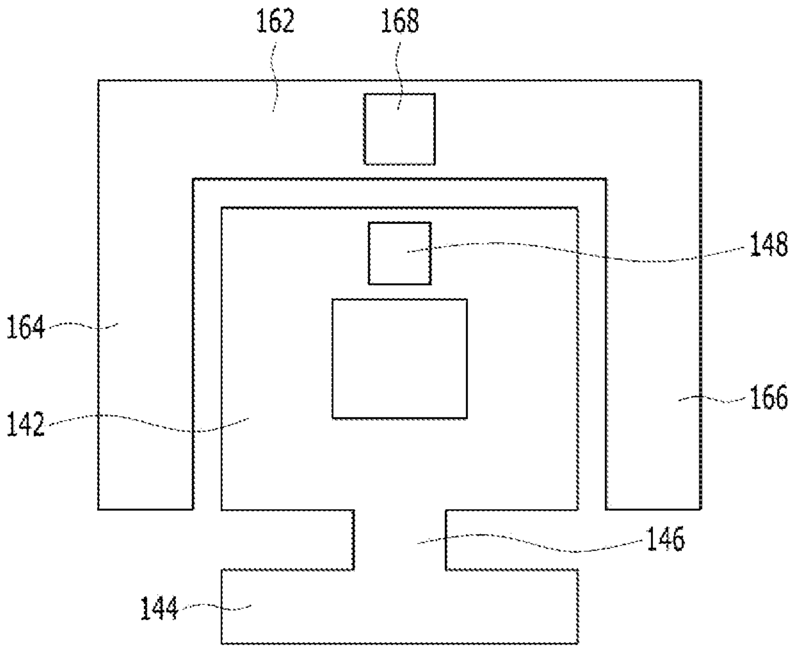

[FIG. 7]
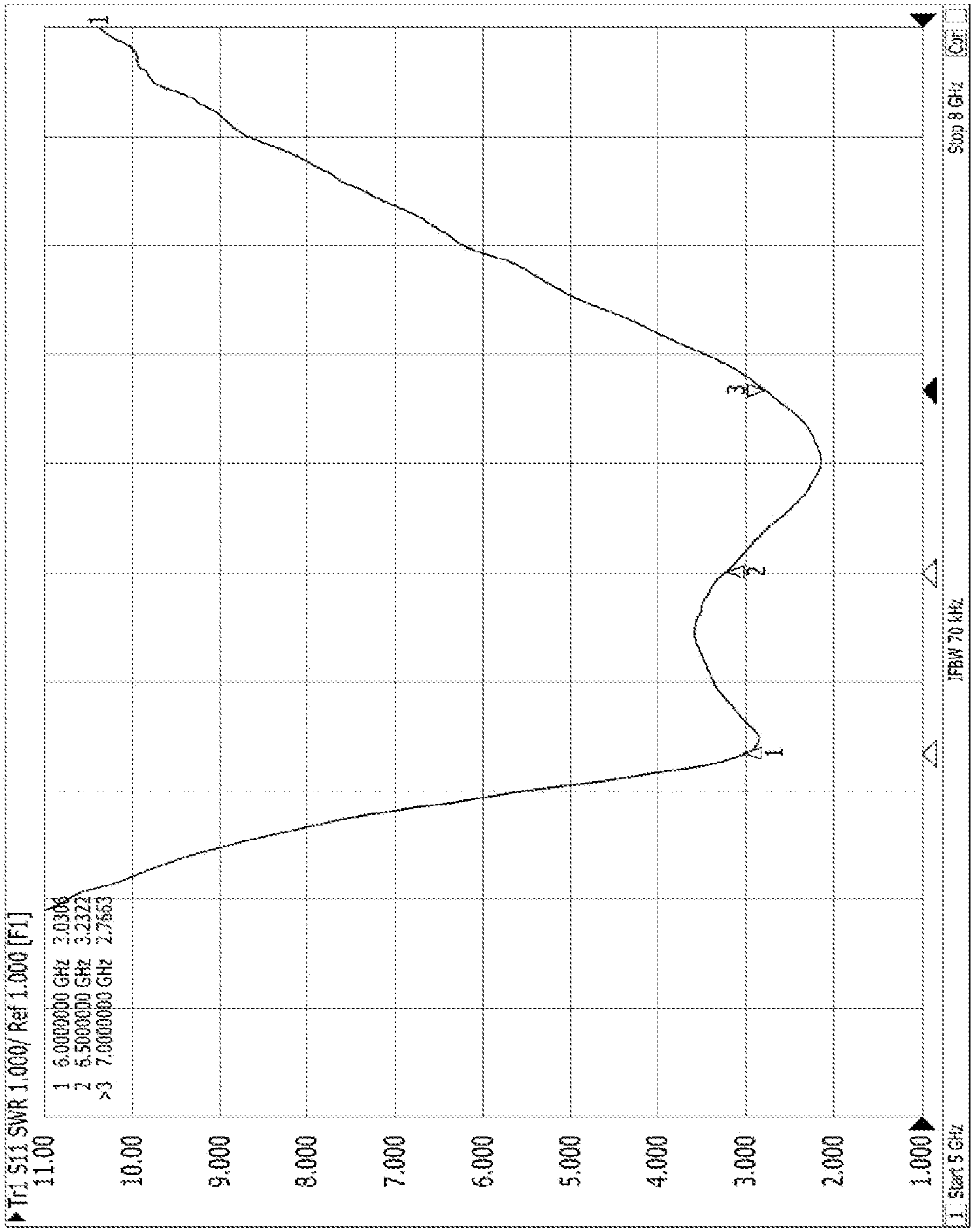

[FIG. 8]
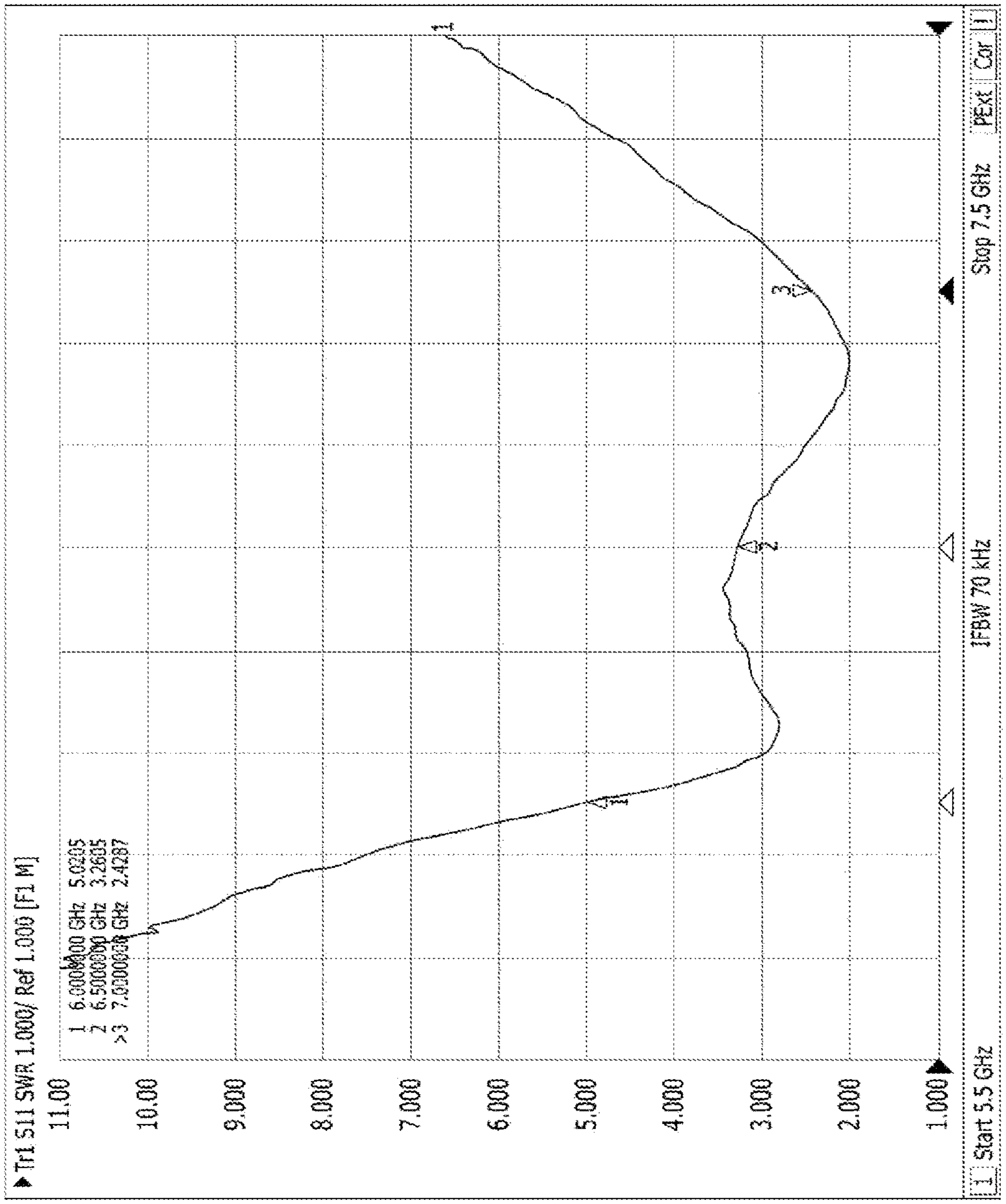

[FIG. 9]

| Frequency (MHz) | Efficiency (%) | Gain (dB) | |
|---|---|---|---|
| | | Average | Peak |
| 6000 | 22.98 | -6.39 | -0.17 |
| 6050 | 41.26 | -3.85 | 1.80 |
| 6100 | 37.31 | -4.28 | 1.84 |
| 6150 | 39.58 | -4.03 | 1.85 |
| 6200 | 32.76 | -4.85 | 1.17 |
| 6250 | 33.54 | -4.74 | 1.72 |
| 6300 | 37.47 | -4.26 | 2.03 |
| 6350 | 31.55 | -5.01 | 1.16 |
| 6400 | 37.35 | -4.28 | 1.63 |
| 6450 | 40.21 | -3.96 | 2.21 |
| 6500 | 30.50 | -5.16 | 1.52 |
| 6550 | 34.58 | -4.61 | 1.09 |
| 6600 | 30.98 | -5.09 | 1.37 |
| 6650 | 36.30 | -4.40 | 2.19 |
| 6700 | 28.42 | -5.46 | 1.06 |
| 6750 | 36.29 | -4.40 | 2.83 |
| 6800 | 29.14 | -5.35 | 1.96 |
| 6850 | 25.34 | -5.96 | 1.74 |
| 6900 | 29.60 | -5.29 | 2.56 |
| 6950 | 28.84 | -5.40 | 2.95 |
| 7000 | 22.52 | -6.48 | 1.80 |

[FIG. 10]

| Frequency (MHz) | Efficiency (%) | Gain (dB) | |
|---|---|---|---|
| | | Average | Peak |
| 6000 | 21.25 | -6.73 | 0.01 |
| 6050 | 42.21 | -3.75 | 3.63 |
| 6100 | 38.96 | -4.09 | 2.88 |
| 6150 | 45.09 | -3.46 | 4.37 |
| 6200 | 37.94 | -4.21 | 3 |
| 6250 | 39.55 | -4.03 | 3.43 |
| 6300 | 44.72 | -3.49 | 3.76 |
| 6350 | 39.33 | -4.05 | 3.74 |
| 6400 | 44.37 | -3.53 | 4.57 |
| 6450 | 47.85 | -3.2 | 4.31 |
| 6500 | 35.13 | -4.54 | 2.83 |
| 6550 | 40.37 | -3.94 | 3.53 |
| 6600 | 36.83 | -4.34 | 3.34 |
| 6650 | 42.34 | -3.73 | 3.74 |
| 6700 | 36.44 | -4.38 | 3.19 |
| 6750 | 46.08 | -3.36 | 4.57 |
| 6800 | 37.36 | -4.28 | 3.61 |
| 6850 | 33.29 | -4.78 | 3.71 |
| 6900 | 38.06 | -4.19 | 4.13 |
| 6950 | 36.36 | -4.39 | 3.7 |
| 7000 | 28.1 | -5.51 | 2.6 |

[FIG. 11]
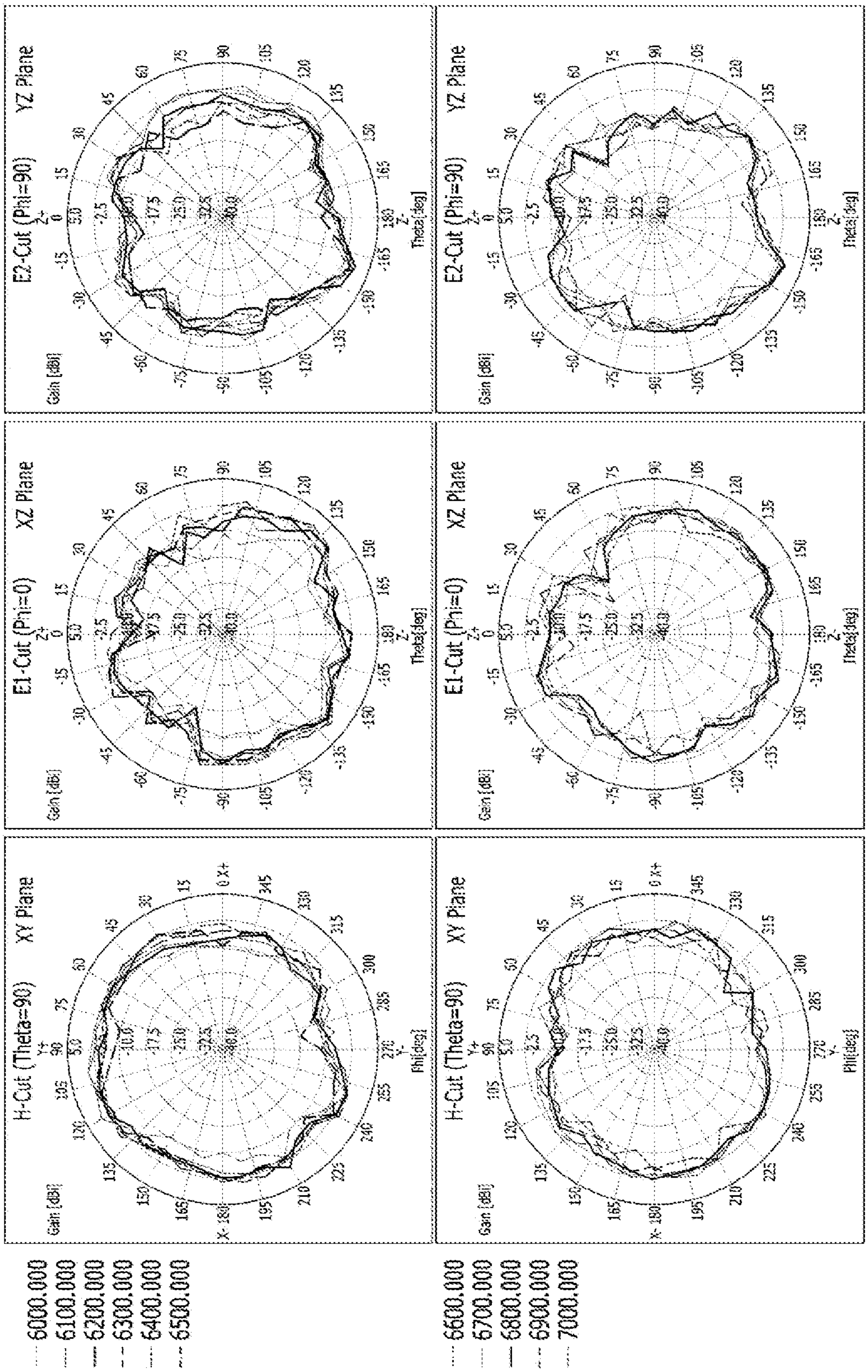

[FIG. 12]
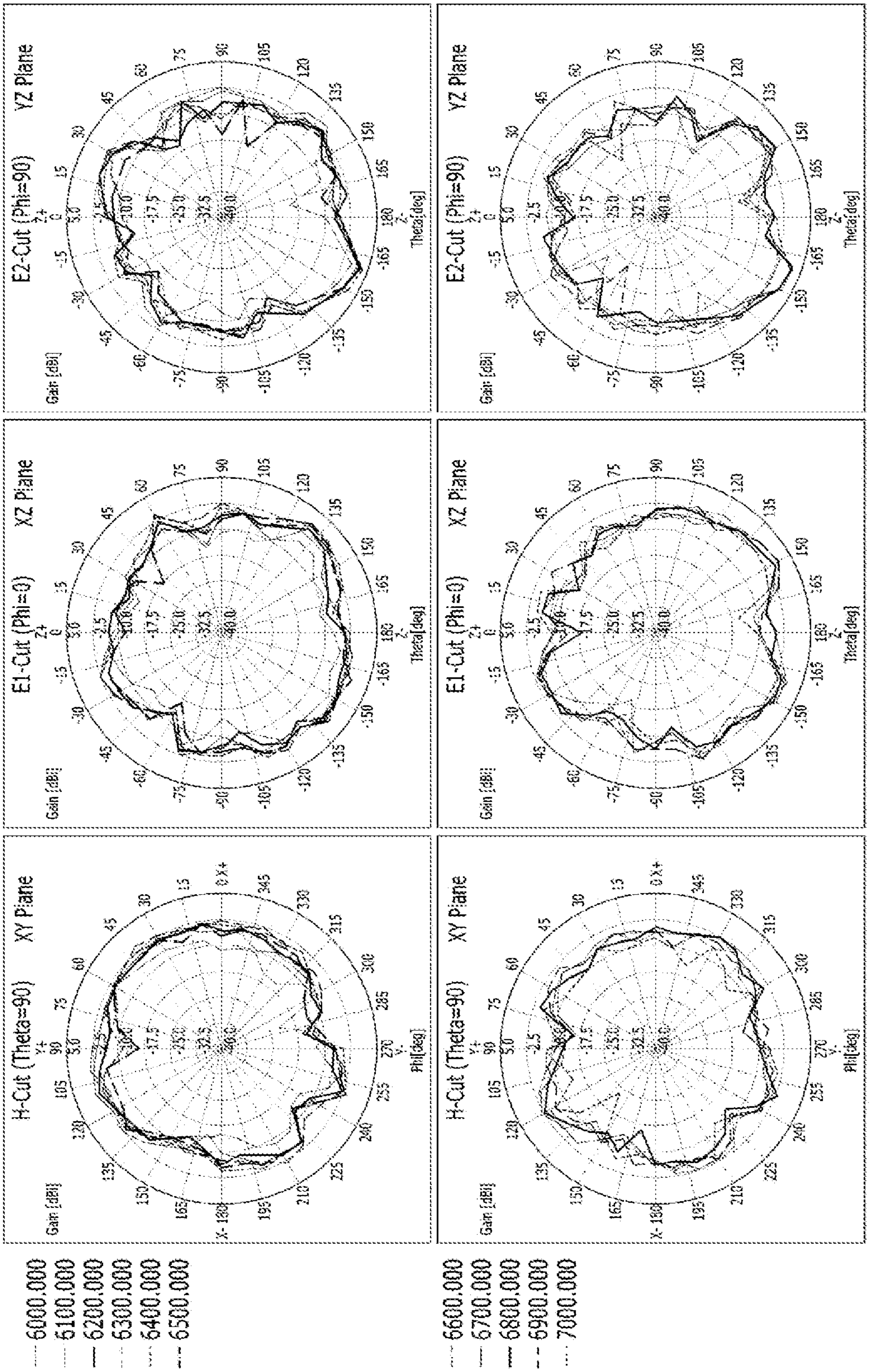

[FIG. 13]
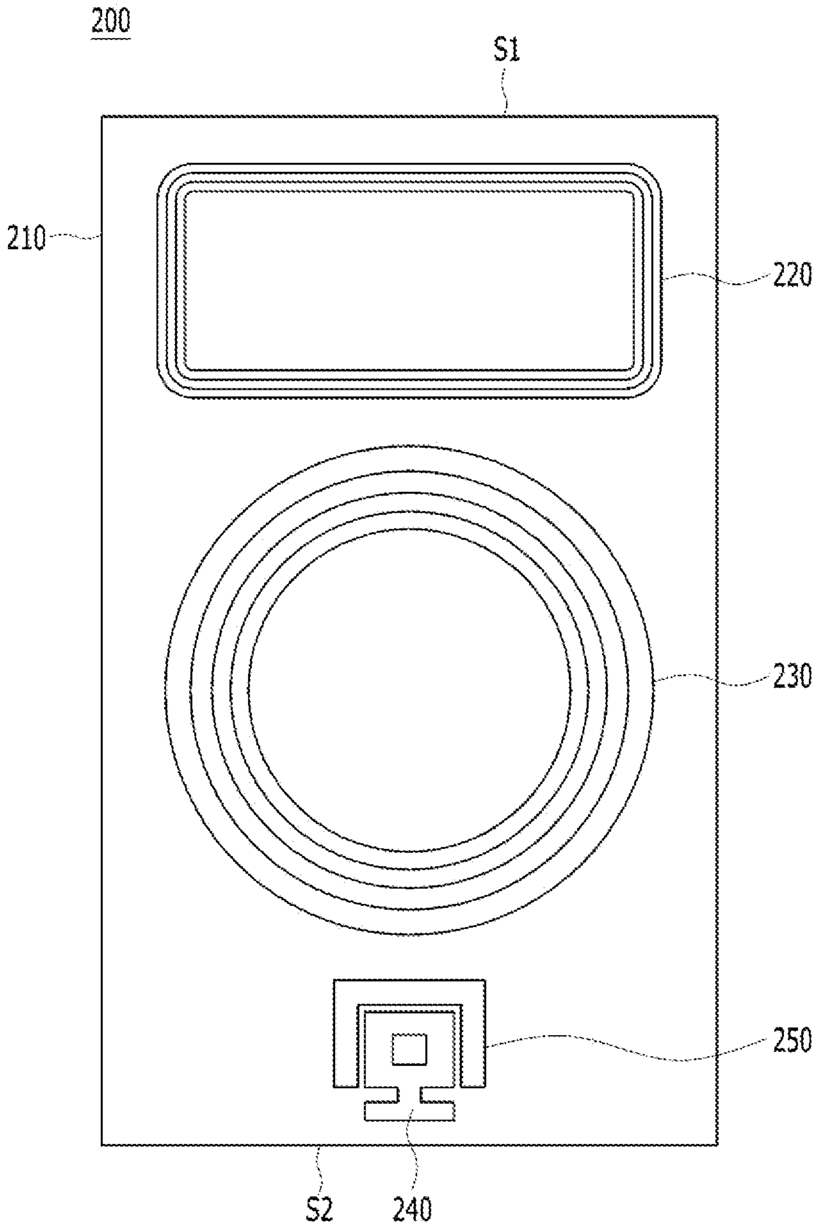

[FIG. 14]
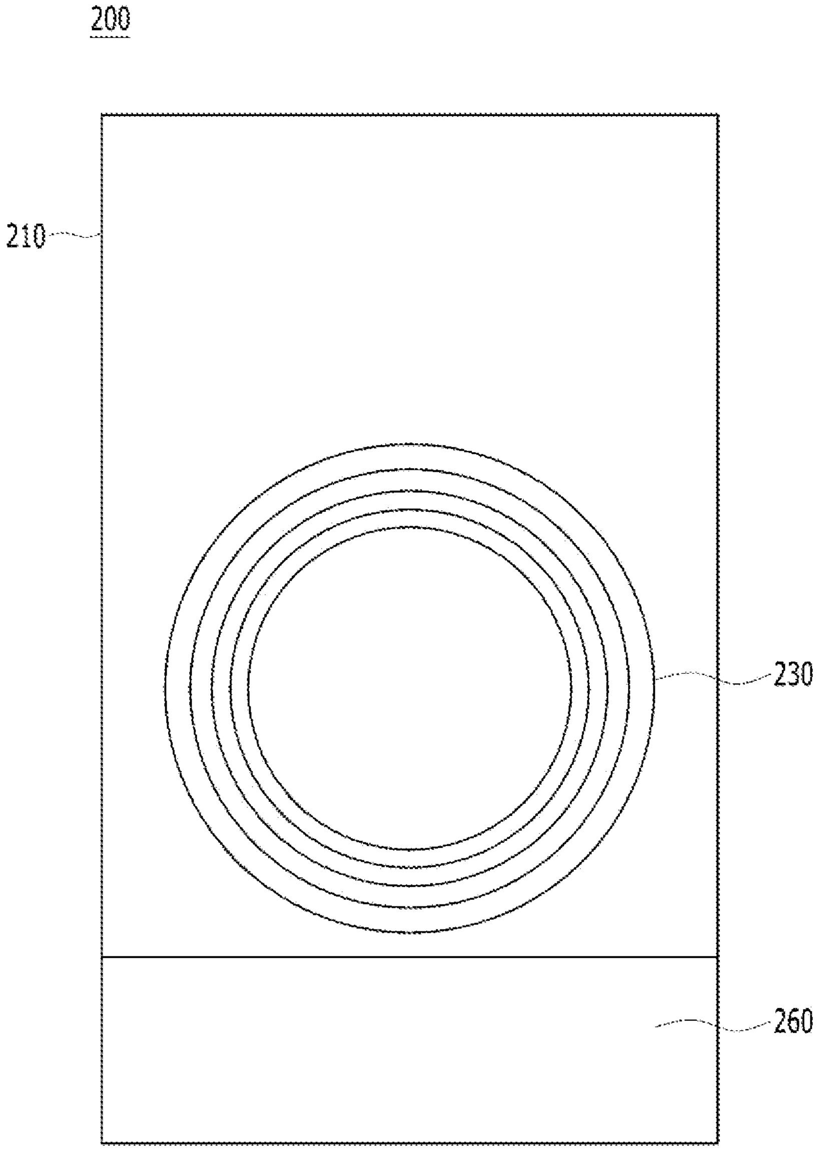

[FIG. 15]
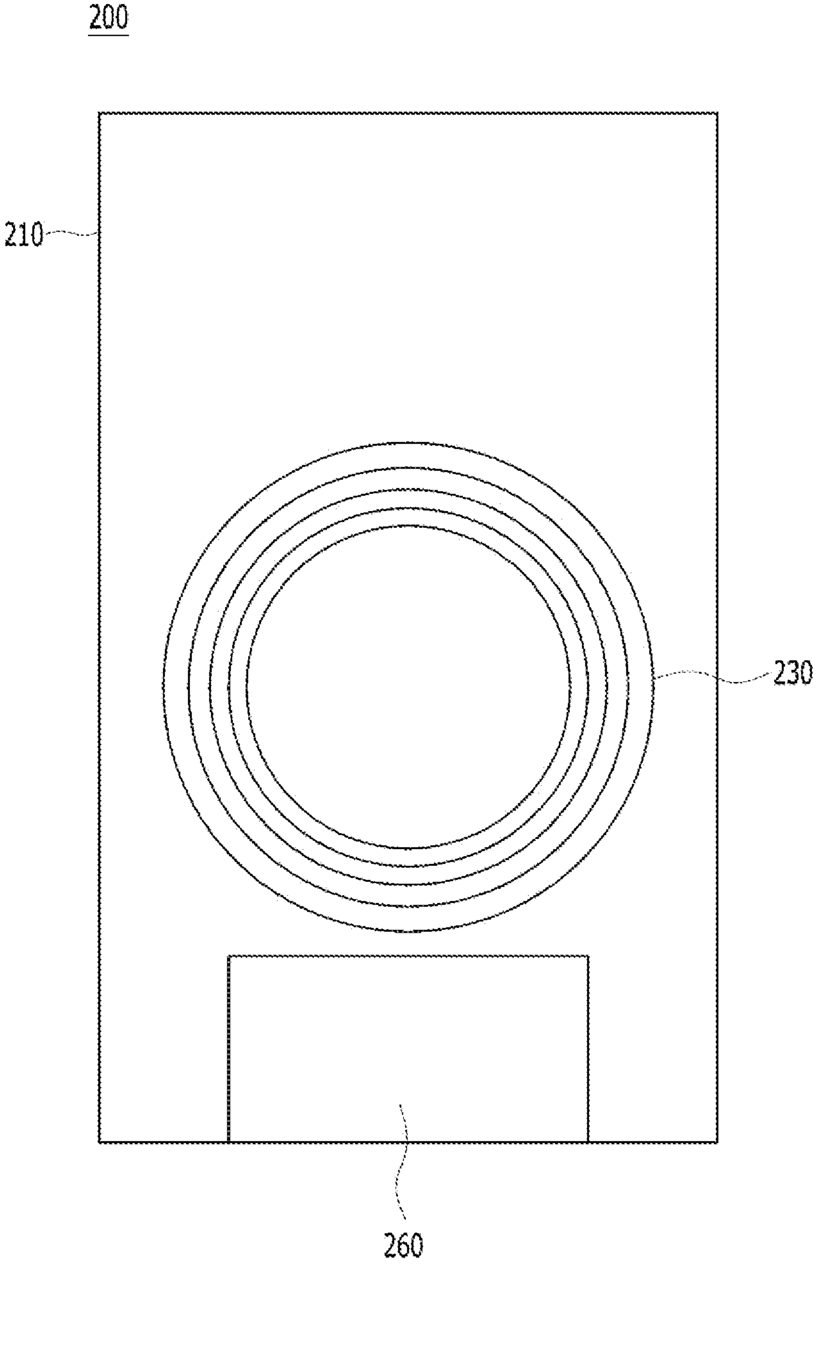

[FIG. 16]
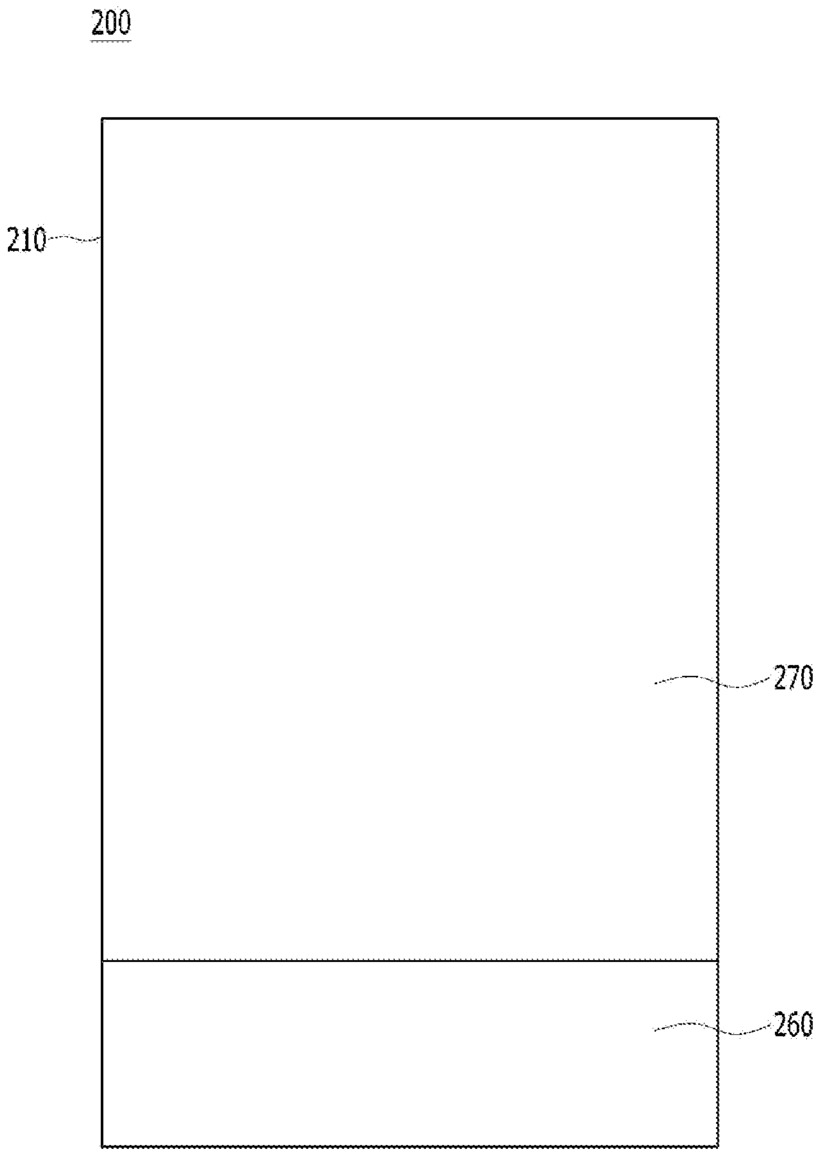

[FIG. 17]
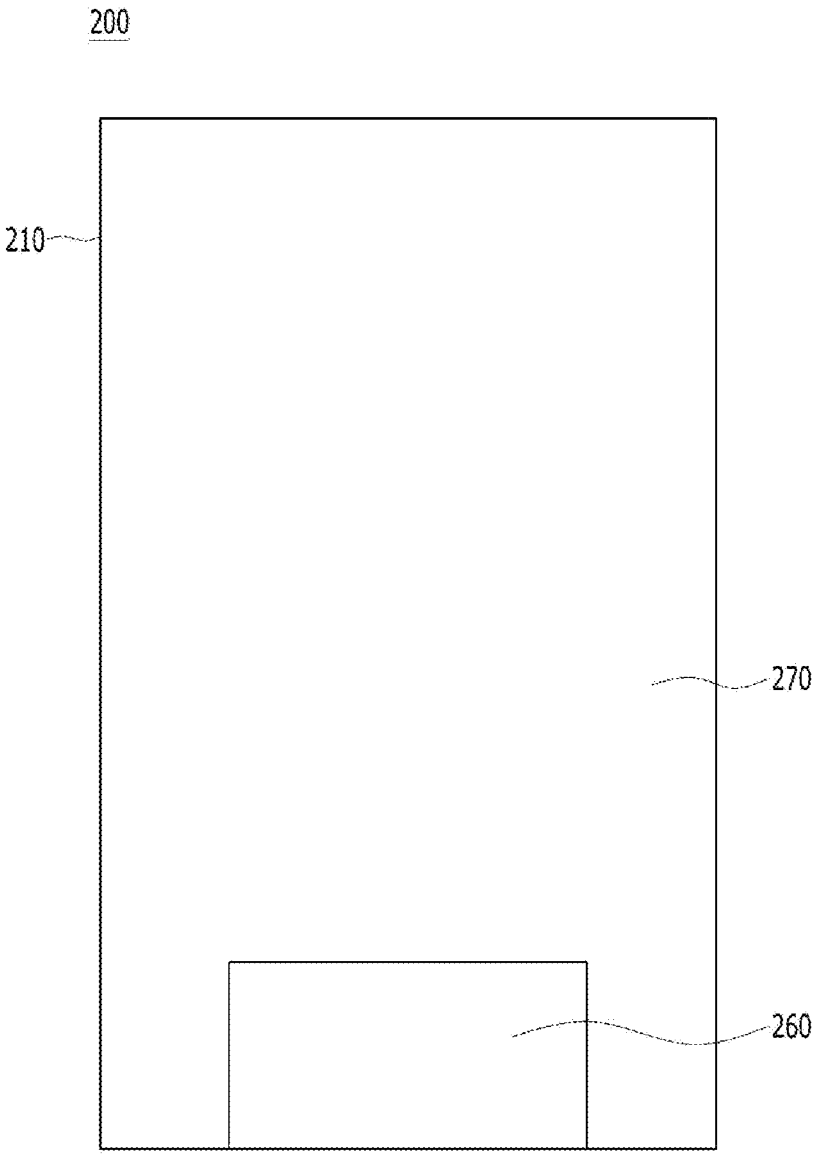

UWB ANTENNA MODULE

TECHNICAL FIELD

The present disclosure relates to a UWB antenna module.

BACKGROUND ART

Recently, a technology for replacing a smart key of a vehicle with a portable terminal is being studied. In order for the portable terminal to replace the smart key, a UWB antenna module used for indoor positioning is required.

Since a plurality of antennas are already mounted in the portable terminal, there is an insufficient space for mounting the UWB antenna module. The portable terminal has the thickness of about 7 mm to 9 mm and it is difficult to mount an antenna with a thickness exceeding 1 mm therein.

If the UWB antenna module is mounted on a battery (i.e., a metal ground plane) in a state of being formed in a thickness of 1 mm or less, the antenna performance is reduced. In particular, since the UWB antenna module has directional characteristics when mounted on the battery, there is a problem in that it is not possible to implement omni-directional characteristics to replace the smart key.

SUMMARY OF INVENTION

Technical Problem

The present disclosure is proposed to solve the conventional problem, and an object of the present disclosure is to provide a UWB antenna module that implements omni-directional characteristics with respect to bearings even when mounted on a metal ground plane.

Solution to Problem

To achieve the object, a UWB antenna module according to an exemplary embodiment of the present disclosure includes a base sheet; a radiation pattern formed on a front surface of the base sheet; and a ground pattern formed on the front surface of the base sheet and disposed to surround the radiation pattern.

The radiation pattern can include a first radiation pattern of a square frame shape; a second radiation pattern disposed to be spaced apart from the first radiation pattern; and a third radiation pattern connecting the first radiation pattern to the second radiation pattern, the ground pattern can be disposed to surround adjacent three sides of four sides of the first radiation pattern, and the third radiation pattern can be connected to one side of four sides of the first radiation pattern that is not surrounded by the ground pattern.

The first radiation pattern can have a first side; a second side having one end connected to one end of the first side; a third side having one end connected to the other end of the first side; and a fourth side having one end connected to the other end of the second side and the other end connected to the other end of the third side, the ground pattern can include a first ground pattern spaced apart from the first side of the first radiation pattern and disposed parallel to the first side; a second ground pattern connected to the one end of the first ground pattern and disposed parallel to the second side of the first radiation pattern; and a third ground pattern disposed to face the second ground pattern with the first radiation pattern interposed therebetween, connected to the other end of the first ground pattern, spaced apart from the third side of the first radiation pattern, and disposed parallel to the third side.

The one end of the third radiation pattern can be connected to the fourth side of the first radiation pattern, and the other end of the third radiation pattern can be connected to the second radiation pattern.

The UWB antenna module according to the exemplary embodiment of the present disclosure can further include a radiation sheet disposed in a region of a rear surface of the base sheet, which overlaps with the radiation pattern, and the radiation sheet can be disposed to cover the entire rear surface of the base sheet.

To achieve the object, a combo antenna module according to an exemplary embodiment of the present disclosure includes a base sheet, a radiation pattern disposed on a front surface of the base sheet, a radiation pattern for UWB disposed on the front surface of the base sheet and spaced apart from the radiation pattern, and a ground pattern disposed on the front surface of the base sheet and disposed to surround the radiation pattern for UWB.

The ground pattern can be disposed to surround three sides of four sides of a virtual square region in which the radiation pattern for UWB is formed.

The combo antenna module according to the exemplary embodiment of the present disclosure can further include a radiation sheet disposed on a rear surface of the base sheet, and the radiation sheet can be disposed to cover a region of the rear surface of the base sheet that overlaps with the virtual square region in which the radiation pattern for UWB is formed.

The combo antenna module according to the exemplary embodiment of the present disclosure can further include a magnetic sheet disposed on a rear surface of the base sheet, in which the magnetic sheet can be disposed to cover a region of the rear surface of the base sheet excluding a region in which the radiation sheet is disposed.

Advantageous Effects of Invention

According to the present disclosure, the UWB antenna module can transmit or receive the signal in the UWB frequency band even when mounted on the portable terminal because it has the omni-directional characteristics while always maintaining the constant antenna characteristics even when the battery, etc. forming the metal ground is disposed on the rear surface thereof due to the insufficient mounting space.

BRIEF DESCRIPTION OF DRAWINGS

FIG. 1 is a perspective diagram showing a UWB antenna module according to an exemplary embodiment of the present disclosure.

FIG. 2 is an exploded perspective diagram showing the UWB antenna module shown in FIG. 1.

FIG. 3 is a side diagram showing the UWB antenna module shown in FIG. 1.

FIG. 4 is a diagram for explaining a radiation pattern shown in FIG. 2.

FIGS. 5 and 6 are diagrams for explaining a ground pattern shown in FIG. 2.

FIG. 7 is a diagram showing the result of measuring a VSWR of the UWB antenna module in a state where there is no metal ground.

FIG. 8 is a diagram showing the result of measuring the VSWR of the UWB antenna module in a state where there is the metal ground (i.e., state of being mounted on the battery).

FIG. 9 is a diagram showing the result of measuring a gain of the UWB antenna module in the state where there is no metal ground.

FIG. 10 is a diagram showing the result of measuring the gain of the UWB antenna module in the state where there is the metal ground (i.e., state of being mounted on the battery).

FIG. 11 is a diagram showing the result of measuring a 2D radiation pattern (omni-directional pattern) of the UWB antenna module in the state where there is no metal ground.

FIG. 12 is a diagram showing the result of measuring the 2D radiation pattern (omni-directional pattern) of the UWB antenna module in the state where there is the metal ground (i.e., state of being mounted on the battery).

FIGS. 13 to 17 are diagrams for explaining the UWB antenna module according to the exemplary embodiment of the present disclosure.

DESCRIPTION OF EMBODIMENTS

Hereinafter, the most preferred exemplary embodiments of the present disclosure will be described with reference to the accompanying drawings in order to specifically describe the present disclosure such that those skilled in the art to which the present disclosure pertains may easily carry out the technical spirit of the present disclosure. First, in adding reference numerals to the components of each drawing, it should be noted that the same components have the same reference numerals, if possible, even if they are illustrated in different drawings. In addition, in describing the present disclosure, when it is determined that the detailed description of the related publicly-known configuration or function may obscure the subject matter of the present disclosure, the detailed description thereof will be omitted.

Referring to FIGS. 1 to 3, a UWB antenna module 100 according to an exemplary embodiment of the present disclosure is configured to include a base sheet 120, a radiation pattern 140, a ground pattern 160, and a radiation sheet 180. A thickness (D) of the UWB antenna module 100 is, for example, about 1 mm or less in a state where the base sheet 120, the radiation pattern 140, the ground pattern 160, and the radiation sheet 180 are all formed.

The base sheet 120 is made of an insulating material or a dielectric material, and formed in a plate shape with a predetermined shape. The base sheet 120 is, for example, a polyimide sheet with the thickness of about 0.4 mm or less.

The radiation pattern 140 is made of a metal material such as copper and disposed on a front surface of the base sheet 120. The radiation pattern 140 is formed in various shapes within a virtual square space on the base sheet 120.

For example, referring to FIG. 4, the radiation pattern 140 is composed of a first radiation pattern 142, a second radiation pattern 144, and a third radiation pattern 146. At this time, the first radiation pattern 142 to the third radiation pattern 146 are shown as if they are separated to easily describe the radiation pattern 140 but can be integrally formed in the real product.

The first radiation pattern 142 is formed in a square frame shape with a hole formed in a central portion thereof. The first radiation pattern 142 can have a first side **142*a*; a second side 142*b* having one end connected to one end of the first side 142*a*; a third side 142*c* having one end connected to the other end of the first side 142*a*; and a fourth side 142*d* having one end connected to the other end of the second side 142*b* and the other end connected to the other end of the third side 142*c***.

The second radiation pattern 144 is formed in the square shape and disposed under the first radiation pattern 142. At this time, the second radiation pattern 144 is disposed to be spaced apart from a lower portion of the first radiation pattern 142 at a predetermined interval.

The third radiation pattern 146 connects the first radiation pattern 142 to the second radiation pattern 144. The third radiation pattern 146 is disposed between the first radiation pattern 142 and the second radiation pattern 144 to connect the first radiation pattern 142 to the second radiation pattern 144.

Meanwhile, the radiation pattern 140 can further include a power feeding terminal pattern 148 for power feeding. The power feeding terminal pattern 148 is formed on the first radiation pattern 142. At this time, the power feeding terminal pattern 148 can be formed on the second radiation pattern 144 or the third radiation pattern 146 according to a design of an antenna, and a location to be disposed can also be changed.

The ground pattern 160 is made of a metal material such as copper and disposed on the front surface of the base sheet 120. The ground pattern 160 is disposed to be spaced apart from the radiation pattern 140. The ground pattern 160 is disposed to surround three sides of the radiation pattern 140. At this time, the ground pattern 160 is disposed to surround three sides of four sides formed by the virtual square space in which the radiation pattern 140 is formed. Here, the ground pattern 160 can also be disposed to surround only a part of the side on left and right sides around one side formed by the virtual square space.

For example, referring to FIGS. 5 and 6, the ground pattern 160 is composed of a first ground pattern 162, a second ground pattern 164, and a third ground pattern 166. Here, the first ground pattern 162 to the third ground pattern 166 are shown as if they are separated to easily describe the ground pattern 160 but can be integrally formed in the real product.

The first ground pattern 162 is formed in the square shape and disposed above the radiation pattern 140. The first ground pattern 162 is disposed above the first radiation pattern 142 of the radiation pattern 140 and disposed to be spaced apart from the first radiation pattern 142 at a predetermined interval.

The second ground pattern 164 is formed in the square shape and disposed on a left side of the radiation pattern 140. The second ground pattern 164 is disposed on a left side of the first radiation pattern 142 of the radiation pattern 140, and disposed to be spaced apart from the first radiation pattern 142 at a predetermined interval.

The third ground pattern 166 is formed in the square shape and disposed on a right side of the radiation pattern 140. The third ground pattern 166 is disposed on a right side of the first radiation pattern 142 of the radiation pattern 140 and disposed to be spaced apart from the first radiation pattern 142 at a predetermined interval.

Therefore, the ground pattern 160 is disposed to surround three sides of the radiation pattern 140. The ground pattern 160 is disposed to surround three sides of four sides of the first radiation pattern 142. Here, while FIG. 6 shows that the ground pattern 160 is disposed to surround only the first radiation pattern 142 of the radiation pattern 140, it is not limited thereto and the second ground pattern 164 and the third ground pattern 166 can also be extended downward in the figure and disposed to surround three sides of the first radiation pattern 142, and left and right sides of the second radiation pattern 144 and the third radiation pattern 146 in the figure.

Meanwhile, the ground pattern 160 can further include a ground terminal pattern 168 for ground. The ground terminal pattern 168 is formed on the first ground pattern 162. At this time, the ground terminal pattern 168 can be formed on the second ground pattern 164 or the third ground pattern 166 according to the design of the antenna, and a location to be disposed can also be changed.

The radiation sheet 180 is made of a metal material such as copper and disposed on a rear surface of the base sheet 120. The radiation sheet 180 is connected through the electromagnetic coupling with the radiation pattern 140 disposed on a front surface of the base sheet 120 to operate as a radiator.

The radiation sheet 180 is formed in a shape covering the entire rear surface of the base sheet 120. For example, if the base sheet 120 is the square shape, the radiation sheet 180 is formed of a conductor sheet of the square shape with the same size as that of the base sheet 120. Here, the radiation sheet 180 can also be formed in a shape covering only a part of the base sheet 120 according to the required antenna characteristics.

Referring to FIGS. 7 and 8, the UWB antenna module 100 has no large difference between VSWR characteristics measured in a state where a metal ground such as a battery is not disposed on a rear surface thereof and a state where the metal ground is disposed, respectively.

Referring to FIGS. 9 and 10, the UWB antenna module 100 has no large difference between antenna characteristics such as efficiency and gain measured in the state where the metal ground such as the battery is not disposed on the rear surface thereof and the state where the metal ground is disposed, respectively.

Referring to FIGS. 11 and 12, the UWB antenna module 100 has no large difference between 2D radiation pattern characteristics in the state where the metal ground such as the battery is not disposed on the rear surface thereof and the state where the metal ground is disposed, and always maintains omni-directional characteristics.

As described above, the UWB antenna module 100 can transmit or receive the signal in the UWB frequency band even when mounted on the portable terminal because it has the omni-directional characteristics while always maintaining the constant antenna characteristics even when the battery, etc. forming the metal ground is disposed on the rear surface thereof due to the insufficient mounting space.

Referring to FIGS. 13 and 14, the UWB antenna module 200 according to the exemplary embodiment of the present disclosure is configured to include a base sheet 210, a first radiation pattern 220, a second radiation pattern 230, a third radiation pattern 240, a ground pattern 250, and a radiation sheet 260.

The base sheet 210 is made of an insulating material or a dielectric material, and formed in a plate shape with a predetermined shape. The base sheet 210 is, for example, a polyimide sheet with a thickness of about 0.4 mm or less.

The first radiation pattern 220 is made of a metal material such as copper and disposed on the front surface of the base sheet 210. The first radiation pattern 220 is disposed adjacent to a first side S1 of the base sheet 210. At this time, the first radiation pattern 220 is, for example, a radiation pattern for near-field communication (NFC).

The second radiation pattern 230 is made of a metal material such as copper and disposed on the front surface of the base sheet 210. The second radiation pattern 230 is disposed between the first radiation pattern 220 and the third radiation pattern 240. At this time, the second radiation pattern 230 is, for example, a radiation pattern for transmitting or receiving wireless power (WPC).

The second radiation pattern 230 can also be disposed on a rear surface of the base sheet 210. The second radiation patterns 230 disposed on front and rear surfaces of the base sheet 210 are connected to each other through a via hole.

The third radiation pattern 240 is made of a metal material such as copper and disposed on the front surface of the base sheet 210. The third radiation pattern 240 is disposed adjacent to a second side S2 of the base sheet 210. At this time, the second side S2 means one side of the base sheet 210 facing the first side S1. Here, the third radiation pattern 240 is, for example, a radiation pattern for ultra-wide band (UWB) communication. The third radiation pattern 240 can be formed in various shapes within a virtual square space on the base sheet 210.

The third radiation pattern 240 can also include a power feeding terminal pattern for power feeding. The power feeding terminal pattern is formed on the third radiation pattern 240. At this time, a location of the power feeding terminal pattern to be disposed can be changed according to a design of an antenna.

The ground pattern 250 is made of a metal material such as copper and disposed on the front surface of the base sheet 210. The ground pattern 250 is disposed to be spaced apart from the radiation pattern. The ground pattern 250 is disposed to surround three sides of the radiation pattern. At this time, the ground pattern 250 is disposed to surround three sides of four sides formed by the virtual square space formed by the radiation pattern. Here, the ground pattern 250 can also be disposed to surround only a part of the side on left and right sides around one side formed by the virtual square space.

The ground pattern 250 can also include a ground terminal pattern for ground. The ground terminal pattern is formed on a first ground pattern 250. At this time, the ground terminal pattern can be formed on a second ground pattern 250 or a third ground pattern 250 according to the design of the antenna, and a location to be disposed can also be changed.

The radiation sheet 260 is made of a metal material such as copper and disposed on a rear surface of the base sheet 210. The radiation sheet 260 is connected through the electromagnetic coupling with the third radiation pattern 240 disposed on a front surface of the base sheet 210 to operate as a radiator.

The radiation sheet 260 is formed in a shape covering a part of the rear surface of the base sheet 210. At this time, the radiation sheet 260 is formed to cover a part including regions of the rear surface of the base sheet 210 in which the third radiation pattern 240 and the ground pattern 250 are formed.

The radiation sheet 260 is extended from the second side S2 of the base sheet 210 toward the first side S1 thereof and formed to cover all of regions in which the third radiation pattern 240 and the ground pattern 250 are formed. At this time, two sides adjacent to one side of the radiation sheet 260 disposed on the same line as the second side S2 of the base sheet 210 are disposed on the same lines as two sides adjacent to the second side S2 of the base sheet 210.

Referring to FIG. 15, the radiation sheet 260 can also be formed to cover only the regions in which the third radiation pattern 240 and the ground pattern 250 are formed. At this time, two sides adjacent to one side of the radiation sheet 260 disposed on the same line as the second side S2 of the base sheet 210 are disposed to be spaced apart from two sides adjacent to the second side S2 of the base sheet 210 in an inner direction of the base sheet 210.

Referring to FIGS. 16 and 17, the UWB antenna module 200 can further include a magnetic sheet 270 disposed on the rear surface of the base sheet 210. At this time, the magnetic sheet 270 is disposed in a region of the rear surface of the base sheet 210 excluding a region which the radiation pattern 260 is disposed. The radiation sheet 260 is exposed to the outside without overlapping with the magnetic sheet 270.

Although the preferred exemplary embodiments of the present disclosure have been described above, it is understood that the present disclosure may be modified in various forms, and those skilled in the art may carry out various modified examples and changed examples without departing from the scope of the claims of the present disclosure.

The invention claimed is:

1. A UWB antenna module comprising:
a base sheet;
a radiation pattern formed on a front surface of the base sheet;
a ground pattern formed on the front surface of the base sheet and disposed to surround the radiation pattern; and
a radiation sheet disposed in a rear surface of the base sheet to cover the entire rear surface of the base sheet, and overlaps with the radiation pattern and the ground pattern.

2. The UWB antenna module of claim 1,
wherein the radiation pattern comprises:
a first radiation pattern of a square frame shape;
a second radiation pattern disposed to be spaced apart from the first radiation pattern; and
a third radiation pattern connecting the first radiation pattern to the second radiation pattern.

3. The UWB antenna module of claim 2,
wherein the ground pattern is disposed to surround three sides adjacent to the first radiation pattern.

4. The UWB antenna module of claim 2,
wherein the third radiation pattern is connected to one side of four sides of a virtual square region formed by the first radiation pattern that is not surrounded by the ground pattern.

5. The UWB antenna module of claim 2,
wherein the first radiation pattern comprises:
a first side;
a second side having one end connected to one end of the first side;
a third side having one end connected to the other end of the first side; and
a fourth side having one end connected to the other end of the second side and the other end connected to the other end of the third side.

6. The UWB antenna module of claim 5,
wherein the ground pattern comprises:
a first ground pattern spaced apart from the first side of the first radiation pattern and disposed parallel to the first side;
a second ground pattern connected to the one end of the first ground pattern and disposed parallel to the second side of the first radiation pattern; and
a third ground pattern disposed to face the second ground pattern with the first radiation pattern interposed therebetween, connected to the other end of the first ground pattern, spaced apart from the third side of the first radiation pattern, and disposed parallel to the third side.

7. The UWB antenna module of claim 5,
wherein the one end of the third radiation pattern is connected to the fourth side of the first radiation pattern, and the other end of the third radiation pattern is connected to the second radiation pattern.

8. The UWB antenna module of claim 1,
wherein the radiation sheet is disposed to cover the entire rear surface of the base sheet.

9. The UWB antenna module of claim 1, further comprising: another radiation pattern disposed on at least one surface of the front and rear surfaces of the base sheet.

10. The UWB antenna module of claim 1, further comprising: a magnetic sheet disposed on a rear surface of the base sheet,
wherein the magnetic sheet is disposed to cover a region of the rear surface of the base sheet excluding a region in which the radiation sheet is disposed.

* * * * *